July 20, 1954 F. KESSLER 2,684,409

REMOTE TESTING APPARATUS FOR TELEPHONE DIALS

Filed Aug. 15, 1950 4 Sheets-Sheet 1

INVENTOR.
FRANK KESSLER

BY Winfred T. Powell
ATTORNEY

July 20, 1954 F. KESSLER 2,684,409

REMOTE TESTING APPARATUS FOR TELEPHONE DIALS

Filed Aug. 15, 1950 4 Sheets-Sheet 2

INVENTOR.
FRANK KESSLER
BY Winfred T. Powell
ATTORNEY

INVENTOR.
FRANK KESSLER
BY Winfred T. Powell
ATTORNEY

REMOTE TESTING APPARATUS FOR TELEPHONE DIALS

Filed Aug. 15, 1950 4 Sheets-Sheet 4

INVENTOR.
FRANK KESSLER
BY Winfred T. Powell
ATTORNEY

Patented July 20, 1954

2,684,409

UNITED STATES PATENT OFFICE 2,684,409

REMOTE TESTING APPARATUS FOR TELEPHONE DIALS

Frank Kessler, Rochester, N. Y., assignor to Stromberg-Carlson Company, a corporation of New York Application August 15, 1950, Serial No. 179,438

14 Claims. (Cl. 179—175.2)

Figure 1:
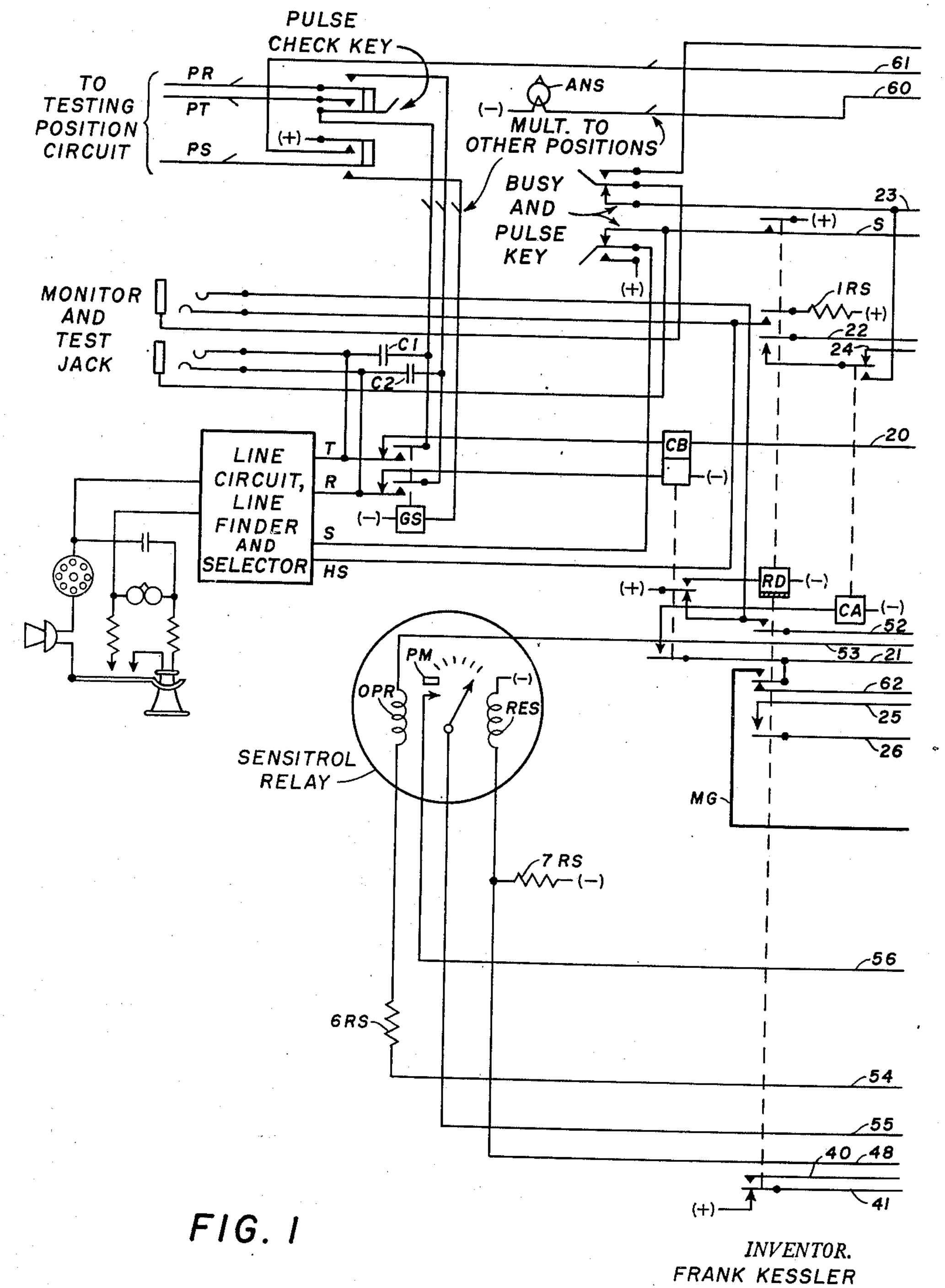
Figure 2:
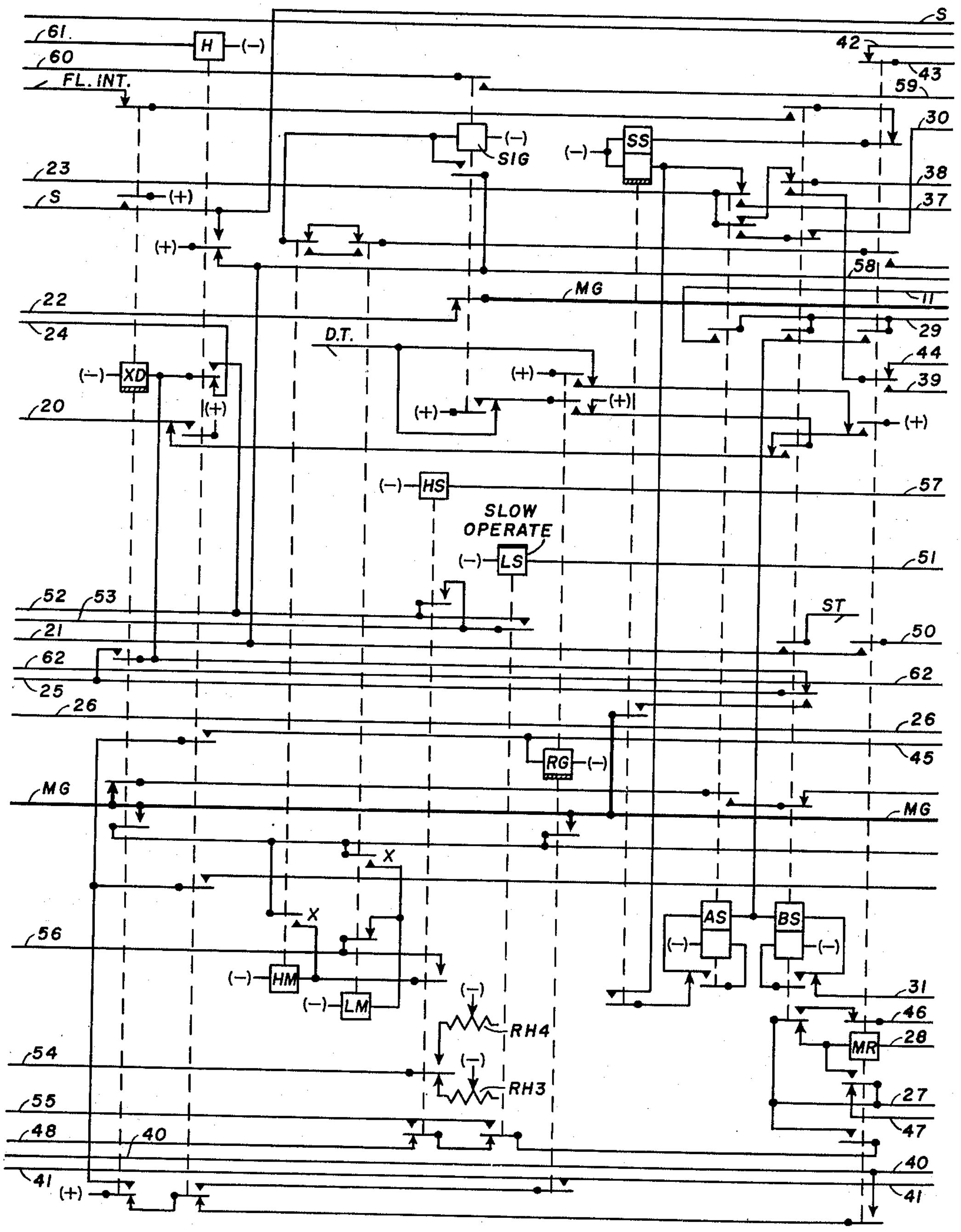
Figure 3:
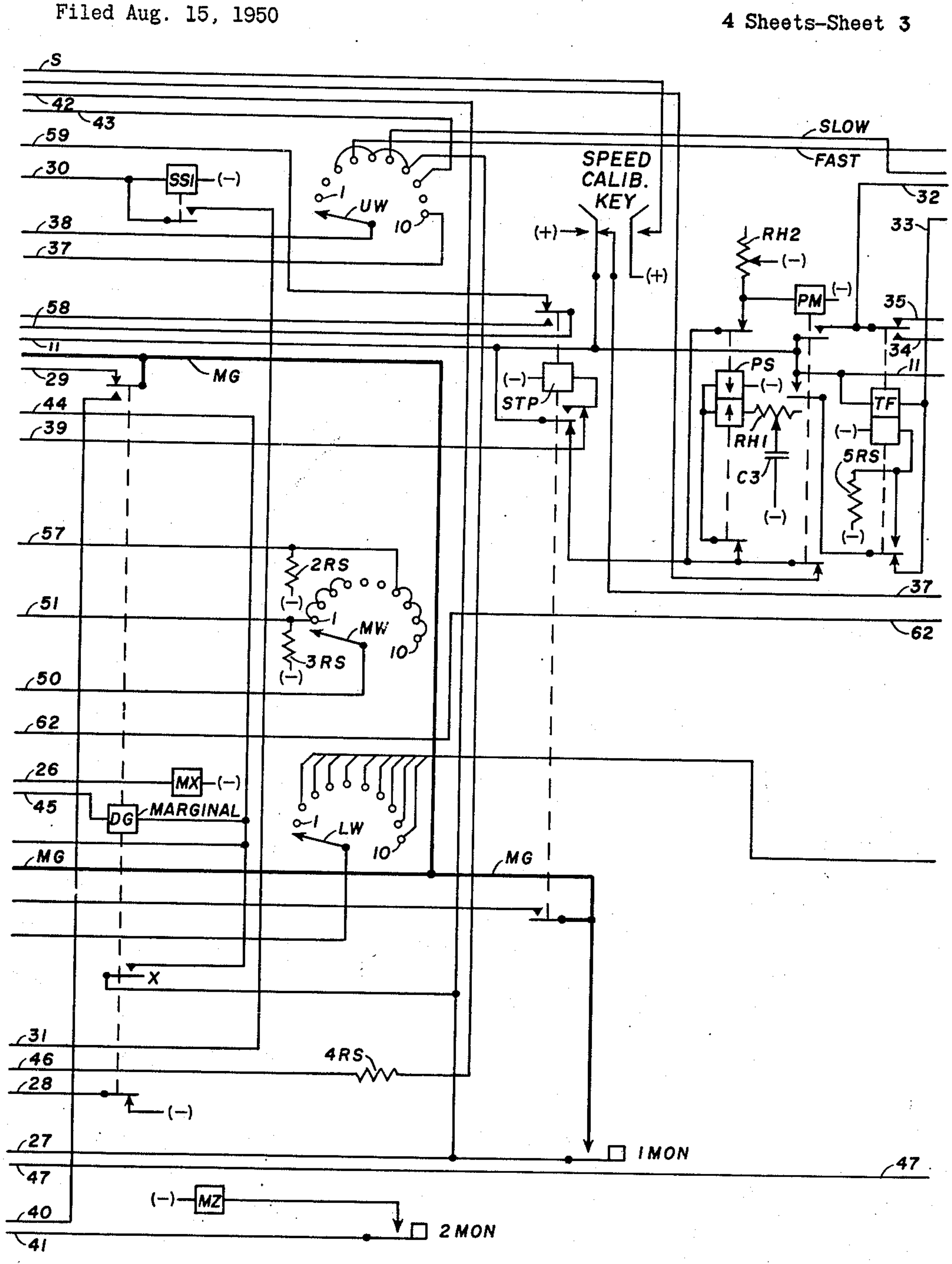

This invention relates in general to apparatus for testing the operation of an impulsing contact of a telephone dial and it more particularly pertains to apparatus for remotely testing the dial speed and the impulse ratio of dials used in an automatic telephone system.

The operation of the switching equipment of an automatic telephone exchange depends upon both the speed and the impulse ratio of the impulses received from the transmitter at the subscriber's substation. Heretofore, automatic testing apparatus has been provided to test the speed of operation of the dial without the intervention of an operator, but the herein disclosed arrangement is believed to be new. Such arrangement provides means for testing the impulse ratio of the dial and, if within properly set predetermined limits, dial tone is sent back to the calling station, while if the impulse ratio is not correct between said limits, the test man in the central office is signaled and no dial tone is sent back to the calling station, thus providing an indication that the impulse ratio is not correct and that the trouble man at the remote station should await an answer from the test man. After such a call is answered by the test man, connections may be made to a proper indicating device at the test desk for indicating the variation of the impulse ratio from normal, so that the test man can transmit this information over the calling line circuit to the calling station.

One object of this invention is to provide new and improved remote testing apparatus for telephone dials.

Another object of this invention is to provide testing means which may be seized from a subscriber's station responsive to an initial dial operation and used to test the dial responsive to its subsequent operations.

Still another object of this invention is to provide means for remotely testing a telephone dial for the ratio of make-to-break portion of digit pulses.

A further object of this invention is to provide means for testing a telephone dial from a subscriber's station and to transmit signals back to the subscriber's station indicating the condition of the dial and, further, to call an operator if the dial tests are outside of predetermined limits.

Yet another object of this invention is to provide means for testing a subscriber's dial from that subscriber's station and for transmitting signals to that subscriber's station indicating the speed of the dial and, further, for preventing the transmission of these speed signals when the ratio of the dial signals is outside of predetermined limits.

When the testing apparatus of the present invention is selected from a calling subscriber's station and the digit 0 is dialed, the dial speed is checked by the apparatus in the test circuit and an indication sent to the calling station indicative of the dial speed, for example, three spurts of tone indicate that the speed is correct within predetermined limits, two spurts of tone indicate that the dial is slow and one spurt of tone indicates that the dial is fast.

It is believed that a complete understanding of the invention may be had by referring to the following description taken in conjunction with the accompanying drawings comprising Figs. 1, 2, 3 and 4, which taken together form a complete schematic diagram of the testing apparatus.

For the purpose of simplifying the illustrations and facilitating the explanation, various parts and circuits constituting the embodiment of the present invention have been shown diagrammatically and certain conventional illustrations have been employed, the drawings having been made more with the purpose of making it easy to understand the operation of the circuits than with the idea of illustrating the specific construction or the arrangement of parts that would be employed in practice. For example, the various relays and their contacts are illustrated in a conventional manner and symbols are used to indicate the connections to the terminals of a battery or other source of current instead of showing all the wiring connections to these terminals. (+) and (−) symbols are employed to indicate the positive and negative terminals respectively of the usual central office common battery instead of using the ground and battery symbols frequently found in telephone circuits, it being understood that the (+) terminal is connected to ground. The various contacts of the relays are located at various distances from the block representing the winding of the relay and the contacts controlled by a relay are indicated as being associated therewith by means of a dashed line.

A minor switch comprising three wipers UW, MW and LW, an operating magnet MX and a release magnet MZ is provided, this minor switch functioning to record the digit (for example 0) dialed into the test apparatus when the calling party selects the test apparatus by dialing a particular level from a selector in the dial office. After recording the dialed digit, the minor switch is released to normal and then begins to step around automatically. During the dialing of the digit into the test apparatus, a standard pulser functions to step a series of stepping or counting relays to provide a series of standard pulses with which the pulses dialed into the minor switch are compared, in a manner which will be pointed out in detail. The standard pulses are twice the dial pulsing speed, for example twenty pulses per second where the dial speed is ten pulses per second. The set of counting relays runs through a cycle twice, the circuits being so connected through contacts of these relays that an indication will be provided for a dial with a normal speed, one with a fast speed and one with a slow speed.

With this general description of the object of the invention and the apparatus involved in mind, a detailed description of the operation under various conditions will now be given. It will be convenient to point out several examples of the circuit operation, such as checking a dial with a normal speed, one with a speed faster than normal and one with a speed slower than normal, together with checking a dial with a proper impulse ratio and one with an improper impulse ratio.

*Dialing test digit*

In this example it will be assumed that the trouble man at a remote station (for example the dial station indicated in the left hand portion of Fig. 1) operates the line circuit, line finder and selector (not shown) in the well known manner to select the test circuit illustrated in the remainder of Figs. 1–4.

It will then be assumed that the trouble man dials 0 to obtain a check and indication of the dial speed. When the test circuit is seized, relay CB is operated over a circuit which may be traced from (+) on the common dial tone conductor DT, break contacts in series of relays RG, MR, BS and H, conductor 20, upper winding of relay CB, break contact of relay GS, tip conductor T, through the line, finder and selector circuits and through the substation circuit back over conductor R, break contact of relay GS and lower winding of relay CB to (—). The calling party receives dial tone over this circuit as an indication that the test digit may be dialed. Relay CA is operated at this time over a circuit extending from (+), break contact of relay H, conductor 21, make contact of relay CB and winding of relay CA to (—). Relay RD is also operated at this time over a circuit extending from (+), make contact of relay CB and winding of relay RD to (—). Sleeve conductor S is connected to (+) at a make contact of relay RD by way of a break contact of the busy and pulse key, thus providing holding and make busy potential in the well known manner. Conductor HS is also connected to (+) by way of a make contact of relay RD and resistor 1RS, this circuit being used in connection with certain operations not pertinent to the present invention. (+) is connected to master ground conductor MG over a circuit extending from (+), break contact of relay H, conductor 21 and make contact of relay RD to conductor MG. Relay SS is also operated at this time over a circuit extending from (+) on conductor MG, break contact of relay SIG, conductor 22, make contact of relay RD, make contact of relay CA, conductor 23, break contact of relay AS and lower winding of relay SS to (—).

When the dial transmits the ten impulses of the test digit, relay CB releases ten times to repeat these impulses, after which it remains energized. Relay CA repeats the operations of relay CB since the above described circuit to the winding of relay CA is intermittently opened at a make contact of relay CB. Relay CB intermittently opens the circuit to the winding of relay RD, but this relay does not release during the impulses transmitted because of its slow acting characteristics. Relay XD is operated at the beginning of the first impulse over a circuit which may be traced from (+) on conductor MG, break contact of relay SIG, conductor 22, make contact of relay RD, break contact of relay CA, conductor 24, break contact of relay H and winding of relay XD to (—). Although this circuit is intermittently opened each time relay CA energizes, relay XD remains operated, due to its slow acting characteristics, until relay CA stays operated at the end of the impulse transmission, at which time relay XD is released. Minor switch stepping magnet MX is intermittently energized by the impulses applied to the winding of relay XD, the circuit extending from the winding of the XD relay, break contact of relay BS, conductor 25, make contact of relay RD, conductor 26 and winding of magnet MX to (—). As will be later pointed out, relay BS is operated at the second impulse, consequently the above described circuit MX is opened but a substitute circuit extends by way of a make contact of relay XD and a make contact of relay RD to the MX magnet, this substitute circuit remaining effective all during the series of impulses because relay XD remains operated. In response to the ten impulses of the series, magnet MX steps the minor switch around to position 10.

At the first step off normal of the minor switch a circuit is closed for operating relay MR which may be traced from (+), on master ground conductor MG, minor switch off normal contact 1MON, conductor 27, break contact of relay BS, winding of relay MR, conductor 28 and break contact of relay DG to (—). Relay MR closes a locking circuit for itself at its lower inner make contact which is independent of the break contact of relay BS, thus maintaining relay MR operated after relay BS is operated.

Relay AS is now operated over a circuit extending from (+) on conductor MG, break contact of relay DG, conductor 29, make contact of relay MR, upper winding of relay AS, break contact of relay AS, make contact and lower winding of relay SS to (—). Relay AS closes a locking circuit for itself including the above described circuit and its upper winding, make contact and lower winding of relay AS to (—). When relay CA is released to mark the beginning of the first impulse, the above described operating circuit to the lower winding of relay SS is opened but this relay does not release (because of its slow acting characteristics) until relay MR closes the above described operating circuit for relay AS which includes the lower winding of relay SS, thus energizing this lower winding until relay AS is operated. The operation of relay AS opens up the circuit to the lower winding of relay SS for effecting the release of this relay. A circuit is closed for operating relay SS1, following the operation of relay CA at the end of the first impulse, this circuit extending from (+) on conductor MG, break contact of relay SIG, conductor 22, make contact of relay RD, make contact of relay CA, conductor 23, make contact of relay AS, break contact of relay BS, conductor 30 and winding of relay SS1 to (—). When relay CA releases to mark the beginning of the second impulse, relay BS is operated and relay SS1 is locked over a circuit which may be traced from (+) on conductor MG, break contact of relay DG, conductor 29, make contact of relay MR, upper winding of relay BS, break contact of relay BS, conductor 31, make contact and winding of relay SS1 to (—), this circuit being effective because relay CA opens, at its make contact, the previously described operating circuit for relay SS1. When relay BS is operated it opens up the circuit to the winding of relay SS1 for effecting the release of this relay. Relay BS is now locked operated over the above described circuit including its upper winding, make contact and lower winding of relay BS to (—). (+) potential is now applied to common start conductor ST for starting up the common interrupter mechanism if this mechanism is not already in operation, this circuit extending from (+), break contact of relay H and make contact of relay BS to start conductor ST.

Figure 4:
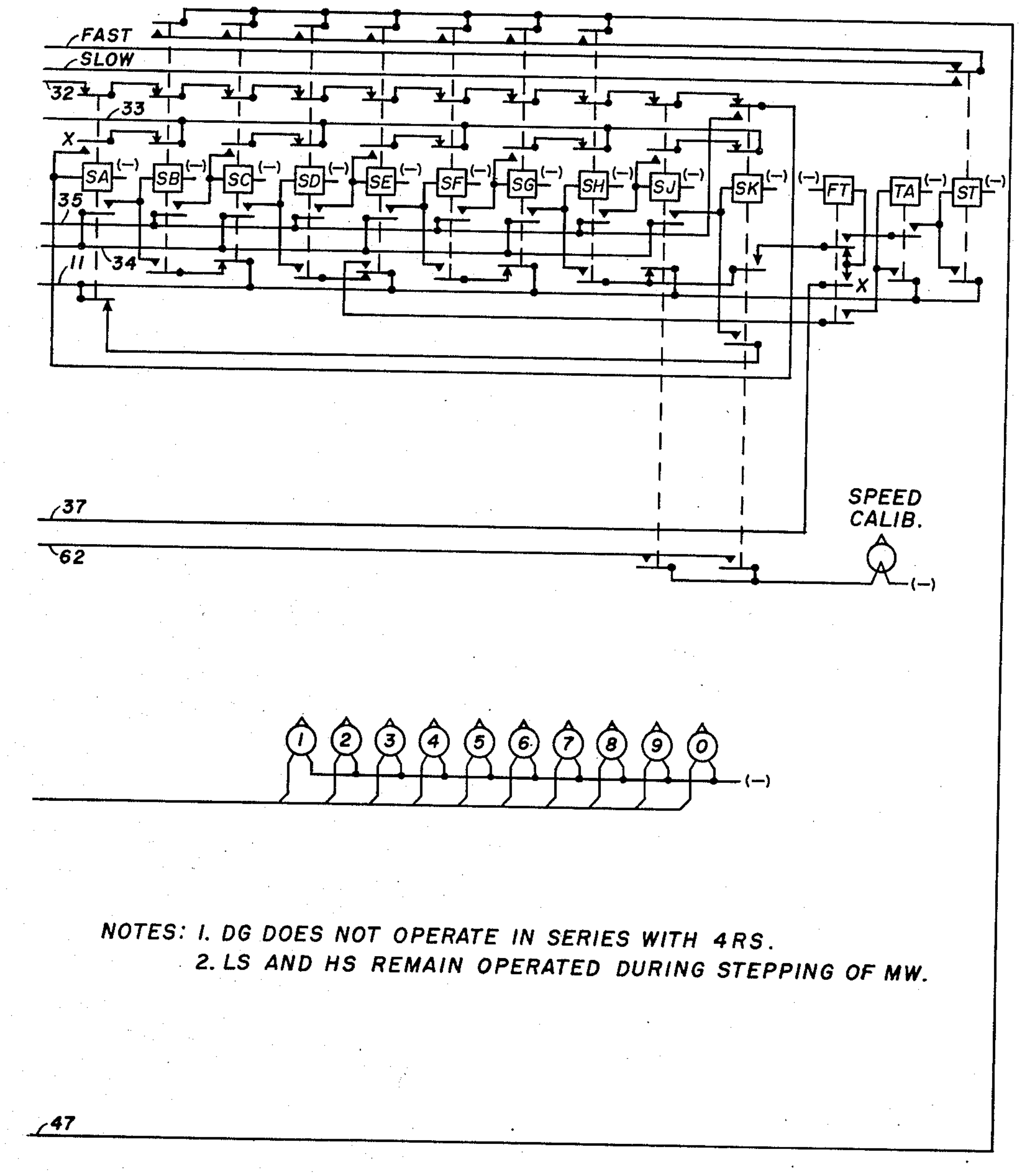

It has already been pointed out that the minor switch is stepped to position 10 and relay XD is released, following the transmission of the ten impulses of the test digit. At this time the minor switch is automatically restored to normal and then automatically stepped around over the contacts of its bank by the pulses on common interrupter conductor FL.INT. Before explaining this part of the circuit operation, it will be convenient to point out how the pulser and counting relay operations shown in the right hand portion of Fig. 3 and in Fig. 4 are effected.

*Standard pulser operation*

With relay AS operated, (+) potential on conductor MG is applied to conductor 11 leading to the pulser and counting relay portion of the circuit, this circuit being traced from conductor MG, break contact of relay DG, conductor 29 and make contact of relay AS to conductor 11. Consequently as long as relay DG remains in its normal position and as long as relay AS remains in its operated position, (+) potential is applied to conductor 11. Relay PS is now operated over a circuit extending from (+) on conductor 11, break contact of relay STP and break contact of relay PS to the left hand terminals of both windings of relay PS. The upper winding is energized and the lower winding is energized in opposition to the upper winding through rheostat RH1 and condenser C3 to (—). Since both windings of relay PS are energized in opposition and since it takes a predetermined time interval to charge condenser C3 over this circuit, relay PS will be delayed slightly in operating until the charging current for condenser C3 ceases to flow through the lower winding of the relay, thus making relay PS slightly slow to operate. At this same time relay PM is operated over a circuit extending from conductor 11, break contact of relay STP, break contact of relay PS and winding of relay PM to (—). When relay PS operates, the circuits to the windings of relays PS and PM are opened. Relay PM is slightly slow to release because of the shunt circuit across its winding including rheostat RH2. Relay PS is slightly slow to release because of the discharge current flow from condenser C3 through both windings of relay PS in series aiding relation. When relay PS is released, the previously described circuits to its windings and to the winding of relay PM are reestablished, thus repeating the operating cycle of these two relays, after which they are released in the previously described manner. It will thus be seen that relays PS and PM comprise a pulse generating device, the speed of which can be regulated by rheostats RH1 and RH2 and the value of condenser C3. It will be understood that relays PS and PM provide a source of pulses for operating the counting relays associated with these pulse generating relays, this source of pulses continuing until stopped in a manner later to be described. As previously mentioned, relays PS and PM operate at a speed to provide twenty impulses per second for operating the ten counting relays SA to SK inclusive through two cycles.

The pulses to the counting relays are provided by the make contacts of relay PM. The first operation of relay PM closes a circuit for operating relay SA which may be traced from (+) on conductor 11, make contact of relay PM, conductor 32, break contacts in series of relays SA—SK and winding of relay SA to (—). Relay SA closes a locking circuit for itself extending from (+) on conductor 11, make contact of relay PM, break contact of relay TF, conductor 33, break contact of relay SB, make contact and winding of relay SA to (—). When relay PM releases to mark the end of the first impulse, transfer relay TF is operated over a circuit extending from (+) on conductor 11, upper winding of relay TF, conductor 33, break contact of relay SB, make contact and winding of relay SA to (—). This circuit, in addition to operating relay TF, locks relay SA, since the release of relay PM disconnects conductor 11 from the right hand terminal of the upper winding of relay TF. Now when relay PM operates to mark the beginning of the second impulse, relay SB is operated over a circuit extending from (+) on conductor 11, make contact of relay PM, make contact of relay TF, conductor 34, make contact of relay SA and winding of relay SB to (—). Relay TF is locked operated at this time over a circuit extending from (+) on conductor 11, make contact of relay PM, make contact and lower winding of relay TF to (—). The operation of relay SB opens up the circuit to relay SA for effecting the release of this relay and at the same time closes a locking circuit for itself extending from (+) on conductor 11, break contact of relay SC, make contact and winding of relay SB to (—). When relay PM releases to mark the end of the second impulse, the above described locking circuit for the lower winding of relay TF is opened and since the upper winding of this relay was opened by the operation of relay SB and the release of relay SA, relay TF is now released.

When relay PM operates to mark the beginning of the third impulse, relay SC is operated over a circuit which may be traced from (+) on conductor 11, make contact of relay PM, break contact of relay TF, conductor 35, make contact of relay SB and winding of relay SC to (—). Relay SC opens up the above described locking circuit for relay SB, thus effecting the release of this relay. Relay SC is now locked operated over a circuit extending from (+) on conductor 11, make contact of relay PM, break contact of relay TF, conductor 33, break contact of relay SD, make contact and winding of relay SC to (—).

When relay PM releases to mark the end of the third impulse, relay TF is operated over a circuit which may be traced from (+) on conductor 11, upper winding of relay TF, conductor 33, break contact of relay SD, make contact and winding of relay SC to (—). When relay PM operates to mark the beginning of the fourth impulse, relay TF is locked and relay SD is operated, the operating circuit for relay SD extending from (+) on conductor 11, make contact of relay PM, make contact of relay TF, conductor 34, make contact of relay SC and winding of relay SD to (−). The locking circuit for relay TF at this time may be traced from (+) on conductor 11, make contact of relay PM, make contact and lower winding of relay TF to (−). Relay SD is locked operated over a circuit extending from (+) on conductor 11, break contact of relay SE, make contact and winding of relay SD to (−). Relay SD opens up and releases relay SC.

It is not believed necessary to point out in detail all of the circuits for operating the remainder of the counting relays SE—SK, since these circuits will be obvious from the above description. Considering the operated condition of relay PM as being "on" periods of the impulse cycle and considering the released condition of relay PM during the cycle as being "off" periods, it will be obvious that relay TF shifts at the "off" periods, being operated on each "off" period following an odd impulse and being released at each "off" period following an even impulse. Furthermore, each of the relays SA—SK are operated (and locked) at each "on" period of the cycle, each being released when the succeeding relay is operated at the succeeding "on" period of the cycle, all in a manner obvious from the previous explanation.

With relay SK operated and locked at the tenth impulse of the series and with all other relays SA—SJ released, relay FT is operated when relay SJ releases at the tenth impulse. The circuit for operating relay FT may be traced from (+) on conductor 11, break contact of relay SJ, make contact of relay SK, break contact and winding of relay FT to (−). The X contact of relay FT closes before the break contact is opened and provides a locking circuit for relay FT extending from (+) on conductor 11, break contact of the speed calibration key, conductor 37, make contact and winding of relay FT to (−). Now when relay PM operates to mark the beginning of the eleventh impulse of the series, relay SA is operated over a circuit extending from (+) on conductor 11, make contact of relay PM, break contact of relay TF, conductor 35, make contact of relay SK and winding of relay SA to (−). Relay SA closes a locking circuit for itself extending from (+) on conductor 11, make contact of relay PM, break contact of relay TF, conductor 33, break contact of relay SB, make contact and winding of relay SA to (−). Relay SA opens, at its lowermost break contact, the circuit to relay SK for effecting the release of this relay. Relays SA to SK are operated during the next ten impulses (11–20) and relay TF is shifted, all in the previously described manner. When relay SE operates at the fifth impulse of the second series (impulse 15) a circuit is closed for operating relay TA which may be traced from (+) on conductor 11, make contact of relay SE, make contact of relay FT and winding of relay TA to (−). Relay TA closes a locking circuit for itself extending from (+) on conductor 11, make contact and winding of relay TA to (−). Now when relay SJ is released, following the operation of relay SK at the twentieth impulse, a circuit is closed for operating relay ST which may be traced from (+) on conductor 11, break contact of relay SJ, make contacts of relays SK, FT and TA in series and winding of relay ST to (−). Relay ST locks itself operated to (+) on conductor 11. The pulse generator and counting relay operations may or may not be stopped at this time, the stopping circuit being pointed out later. If these operations are not stopped at this time, the twenty-first impulse provided by relay PM operates and locks relay SA for again opening up and releasing relay SK and the operations of the other stepping relays are by way of circuits previously described.

*Normal dial speed*

It will be assumed that the ten impulses transmitted from the calling dial are at a rate within the predetermined speed limits, consequently a signal comprising three spurts of dial tone is transmitted back to the calling station in a manner which will now be described. With a normal dial speed, the minor switch will reach position 10 at about the same time that relay SK (or possibly relay SH or relay SA the third time) is operated. When the minor switch reaches position 10 the next operation of relay CA, in response to the termination of the impulse transmission from the dial, closes a circuit for operating stop relay STP, this circuit being traced from (+) on conductor MG, break contact of relay SIG, conductor 22, make contact of relay RD, make contact of relay CA, conductor 23, make contact of relay AS, conductor 37, minor switch wiper UW in position 10, conductor 38, make contact of relay BS, make contact of relay MR, conductor 39, break contact and winding of relay STP to (−). Relay STP closes a locking circuit for itself extending from (+) on conductor 11, make contact and winding of relay STP to (−). The operation of relay STP disconnects (+) on conductor 11 from the operating circuits of the PS and PM relays, thus stopping the pulse generating operation. It will thus be seen that, in this example, the pulsing of the stepping relays is stopped with relay SK (or possibly relay SH or relay SA) operated.

*Release and automatic stepping of minor switch*

The minor switch is now released and automatically stepped over its bank contacts for transmitting three spurts of dial tone to the calling station. When relay XD releases to mark the end of the impulse transmission from the dial, a circuit is closed for operating minor switch release magnet MZ, this circuit being traced from (+), break contact of relay XD, break contact of relay H, make contact of relay MR, conductor 40, make contact of relay RD, conductor 41, off normal contact 2MON and winding of magnet MZ to (−). When the minor switch reaches normal position, the master ground conductor is disconnected from the winding of relay MR at off normal contact 1MON, thus releasing relay MR. The opening of off normal contact 2MON opens up the circuit to magnet MZ. Since relay BS is operated and relay MR is released at this time, a circuit is closed from interrupter FL.INT., break contact of relay XD, make contact of relay BS, break contact of relay MR and upper winding of relay SS to (−). Consequently relay SS is intermittently operated by the pulses on this common interrupter conductor. Each operation of relay SS closes a circuit for stepping magnet MX which may be traced from (+) on conductor MG, make contact of relay SS, make contact of relay BS, conductor 25, make contact of relay RD, conductor 26 and winding of magnet MX to (−). Consequently, the minor switch is automatically stepped around for a second cycle.

Since the indication to be transmitted to the calling station is in response to a normal dial speed registration the minor switch will be stepped past the fourth and sixth bank contacts to which the "fast" and "slow" conductors are connected. The minor switch will be released, however, when it reaches position 8 by means of a circuit for operating relay DG, this circuit being traced from (+) on conductor MG, off normal contact 1MON, conductor 42, uppermost break contact of relay MR, conductor 43, terminal and wiper UW in its eighth position, conductor 38, make contact of relay BS, break contact of relay MR, conductor 44, winding of relay DG, conductor 45 and winding of relay RG to (—). Relay DG operates and locks over a circuit extending from (+) on conductor MG, off normal contact 1MON, make contact of relay DG and windings of relays DG and RG to (—). A circuit is now closed for magnet MZ extending from (+) on conductor MG, make contact of relay DG, conductor 40, make contact of relay RD, conductor 41, off normal contact 2MON and winding of magnet MZ to (—). This releases the minor switch and when this switch reaches normal, magnet MZ is de-energized by the opening of contact 2MON.

Referring back to the automatic stepping operation of the minor switch, when this switch reaches position 3 a circuit is closed to the windings of relays DG and RG extending from (+) on conductor MG, off normal contact 1MON, conductor 27, make contact of relay BS, break contact of relay MR, conductor 46, resistor 4RS, terminal 3 and wiper UW, conductor 38, make contact of relay BS, break contact of relay MR, conductor 44 and windings of relays DG and RG to (—). Resistor 4RS is of such a value that relay RG will be operated but marginal relay DG will not be operated over the above described circuit. When the minor switch steps to position 4, the above described circuit to the RG and DG relays is opened for effecting the release of relay RG. This same circuit is again closed in position 5 and opened in position 6 of the minor switch and again closed in position 7 and opened when the minor switch is restored to normal, as previously explained, by the opening of off normal contact 1MON. Consequently, relay RG is operated three times during the automatic stepping of the minor swtich to position 8 and at each operation of relay RG dial tone is connected to the calling line over a circuit which may be traced from conductor DT, break contact of relay SIG, make contact of relay RG, make contact of relay BS, break contact of relay H, conductor 20 and upper winding of relay CB to the calling line. When relay DG is operated in position 8, as previously described, conductor MG is disconnected from the windings of the AS and BS relays for effecting the release of these relays. The relase of relay BS at this time disconnects the calling line from the circuit through contacts of relay SIG to conductor DT and connects this line through a break contact of relay MR to (+) at the uppermost make contact of relay RG. Since relay RG is slow to release, a short time interval between the transmission of the three spurts of dial tone will be introduced and then when relay RG releases, dial tone is again connected to the calling line. Therefore, three spurts of dial tone are transmitted to the calling line, followed by a slight pause, after which continuous dial tone is applied to the line as an indication that the dialing operation may be repeated if desired, the three spurts of tone indicating that the dial speed is within the predetermined limits.

When relay DG is operated as previously described, (+) on conductor MG is disconnected from conductor 11 thus releasing relays FT, TA, ST, TF, SK (or SJ or SA) and when the minor switch is restored to normal, relays DG and RG are released because of the opening up of contact 1MON.

The circuits are now in the same condition as when seized from the selector switch, that is relays CB, CA, RD and SS are operated and the dial tone is connected to the calling line, all in the previously described manner. If the calling party now hangs up the receiver, these operated relays are released, the dial tone is disconnected from the calling line and conductors S and HS leading back to the preceding circuits are de-energized by the release of relay RD, thus placing the test circuit in normal condition ready for another seizure.

*Fast dial*

It will now be assumed that the circuits are operated in the previously described manner but the calling dial transmits the ten impulses at a higher rate than normal. This means that the minor switch will be stepped to its tenth position from the dial impulses before the pulser advances the stepping relays to the point where relay SJ is operated. For example, the pulser will be stopped by the operation of relay STP (which marks the end of the dial impulse transmission) with relay SH, or some preceding stepping relay operated. Now when the minor switch is released and automatically stepped around by the common interrupted pulses, relay RG is operated when the minor switch reaches position 3 over the previously described circuit which does not operate relay DG. This transmits one spurt of dial tone and now when the minor switch reaches position 4, relays DG and RG are both operated, the circuit being traced from (+) on conductor MG, off normal contact 1MON, conductor 27, break contact of relay MR, conductor 47, make contact of relay SH (or make contact of any one of the relays SB–SG), break contact of relay ST, conductor "fast," terminal and wiper UW in its 4th position, conductor 38, make contact of relay BS, break contact of relay MR, conductor 44 and windings of relays DG and RG to (—). The operation of relay DG stops the tone transmission and clears out the circuits in the previously described manner, consequently one spurt of tone is transmitted to the calling station, followed by continuous tone as an indication that the dialing operation may be repeated. The circuits are now in the previously described condition ready for another dialing operation or for a release operation from the calling station.

*Slow dial*

In this example the ten impulses are transmitted at a slower rate than normal, consequently the stepping relays will go through their two cycles and start through a third cycle before the end of the tenth impulse from the calling dial. This means that the minor switch will reach its tenth position and operate relay STP for stopping the stepping relay operation after relay ST is operated and after some one of the relays SB—SH are operated during the third cycle. Now when the minor switch runs through the second time, that is from the common interrupter, relay RG operates in positions 3 and 5 of wiper UW for transmitting two spurts of dial tone. In position 6 of this wiper, the circuit is closed for operating relays RG and DG, this circuit being traced from (+) on conductor MG, off normal contact 1MON, conductor 27, break contact of relay MR, conductor 47, make contact of some one of the relays SB—SH, make contact of relay ST, conductor "slow," terminal #6 and wiper UW, conductor 38, make contact of relay BS, break contact of relay MR, conductor 44 and windings of relays DG and RG to (−). The operation of relay DG clears out the circuits in the previously described manner, following the transmission of the two spurts of dial tone, after which continuous dial tone is applied to the calling line as an indication that the dialing operation may be repeated. While the clearing out and the dial tone disconnecting circuits have been shown as applied to certain relays of the stepping relay group, it will be obvious that these circuits may be shifted to other contacts of the stepping relays to provide other limits, all in a manner which will be obvious from the previous description.

*Pulse ratio test and indication*

The test circuit is arranged to test the impulse ratio during the stepping of the minor switch in response to the ten impulses transmitted from the dial at the same time that the speed tests are made as above described. It will be understood that the pulse ratio (ratio between the break period and the make period at the dial) is proper when the break period at the dial (relay CB released) is of a proper length compared with the make period at the dial. The break period at the dial may be too long or it may be too short, resulting in relay CB remaining down too long or too short respectively. In order to test the length of the impulse (relay CB released) a "sensitrol" relay is provided for indicating the pulse length. This is a trade name for a very sensitive relay operating on currents from 0 to 300 microamperes for example. This relay comprises an operating winding OPR to which the impulses are applied to determine if they are long enough to close the contacts illustrated in connection with this relay. When the movable contact of the relay, which is the pointer of the meter, advances far enough to close its make contact, the pointer makes mechanical connection with a small high efficiency permanent magnet PM, thus locking the pointer contact in its fully actuated position. In order to restore the contact from its magnetically locked position, a restoring solenoid RES is provided. This solenoid, when energized, pushes the movable pointer away from the permanent magnet and its make contact, thus restoring the pointer to normal ready for another actuation by coil OPR.

*Normal pulse length*

In this example it will be assumed that the pulse length of the dial being tested is within the set limits. This means that the back contact of relay CB will be closed long enough at some one of the first four pulses of the series, during which time wiper MW of the minor switch will be in contact with a circuit leading to relay LS, to operate the pointer of the "sensitrol" relay over to its locking and contacting position, this being effected while the minor switch is in any one of positions 1–4. Rheostat RH3 is in series with the operating winding OPR during this test and is set at the proper value to allow the "sensitrol" relay contact to close when the pulse period is of a predetermined normal length. This means that the "sensitrol" relay contact will also close when measuring a pulse period that is too long. To distinguish between a normal length pulse and a pulse that is too long, certain circuit operations are effective during the time that wiper MW is in positions 7–10 in a manner which will be clearly described.

Referring back to the start of the cycle when the dial impulses are transmitted, it will be recalled that relay MR operates in response to the first impulse of the series. Relay MR closes the restoring circuit of the "sensitrol" relay to restore the pointer in the event that it is in its locked position at the start of the cycle. This circuit may be traced from (+) on conductor MG, off normal contact 1MON, conductor 27, make contact of relay MR, break contact of relay LS, break contact of relay HS, conductor 48 and winding RES to (−). At this same time a circuit is closed for operating relay LS extending from (+), break contact of relay H, make contact of relay MR, conductor 50, wiper MW in its first position, conductor 51 and winding of relay LS to (−). Relay LS is slow to operate and when it operates its contacts, the above described circuit to coil RES is opened for de-energizing this coil, thus a short pulse is applied to coil RES for restoring the pointer to normal.

At some one of the steps of this first cycle, wiper MW in positions 1–4, the operating winding of the "sensitrol" relay will be energized long enough to cause the contact to reach its locking position. This circuit may be traced from (+), break contact of relay CB, make contact of relay RD, conductor 52, make contact of relay LS, conductor 53, winding OPR, resistor 6RS, conductor 54, break contact of relay HS and rheostat RH3 to (−). A circuit is now closed for operating relay LM extending from (+) on conductor MG, off normal contact 1MON, conductor 27, make contact of relay MR, make contact of relay LS, conductor 55, pointer of the "sensitrol" relay and its associated contact, conductor 56, break contact and winding of relay LM to (−). Relay LM closes a locking circuit for itself extending from (+) on conductor MG, make contact of relay XD (energized until the end of the digit transmission), make contact and winding of relay LM to (−). When the minor switch leaves position 4, the above described circuit to relay LS is opened and this relay releases, but relay LM remains locked up until the end of the second cycle of operation of the minor switch by means of circuits that will be explained. When relay LS releases, with the minor switch in position 5, a circuit is closed for energizing coil RES, this circuit being the same as previously described, thus restoring the pointer to normal.

When the minor switch reaches position 7, relay HS is operated over the previously described circuit including wiper MW, now in connection with contact 7, conductor 57 and winding of relay HS to (−). Relay HS switches the winding OPR from rheostat RH3 to rheostat RH4, this latter rheostat calibrating the circuit in such a manner that a normal impulse will not swing the pointer far enough to make contact, while an impulse that is too long will swing the pointer to its contacting position. This means that the impulses transmitted by way of the break contact of relay CB to coil OPR, by way of a make contact of relay HS after relay LS releases, are not sufficiently long to close the contact of the "sensitrol" relay. Consequently, when the minor switch is released at the end of the first cycle it proceeds through the second cycle in the previously described manner. Relay HS is released when the minor switch wiper MW is restored. Neither relay LS nor relay HS is operated during the second cycle of the minor switch because relay MR is released during this cycle for opening up the circuit to wiper MW. With relays LS and HS released, there is no circuit to winding OPR of the "sensitrol" relay, consequently this relay is not affected during the second cycle of the minor switch. The above described operating circuit to coil RES is opened when relay HS operates, thus de-energizing the restoring solenoid of the "sensitrol" relay during the remainder of the circuit operations of the system. Resistors 2RS and 3RS, across the windings of relays HS and LS, render these relays slow to release so they will remain operated during the advance of wiper MW from one contact to another.

From the above explanation it will be observed that relay LM is operated and relay HM is not operated when the minor switch completes its first cycle. Consequently there is no circuit for energizing signal relay SIG when stop relay STP is operated at the end of the first cycle, this because the uppermost contacts of the HM and LM relays are out of correspondence while relay STP is operated and before relay MR is released. The circuits proceed in the previously described manner to transmit dial tone back to the calling station in accordance with the dial speed, followed by a continuous dial tone and the restoration of the circuits to their condition ready for another dialing operation. Since relay SIG is not operated, there is no circuit for energizing answering lamp ANS.

*Pulse length too long*

The circuits run through their cycle of operations in the previously described manner, with relays LS and HS being operated and released and relay LM being operated and locked as before. This time, however, after relay HS is operated some one or more of the pulses is going to be sufficiently long to cause the needle of the "sensitrol" relay to close its contact and lock. When this happens in the second half of the first cycle, a circuit is closed for operating relay HM which may be traced from (+) on conductor MG, off normal contact 1MON, conductor 27, make contact of relay MR, break contact of relay LS, make contact of relay HS, conductor 55, "sensitrol" relay contact, conductor 56, make contact of relay HS and winding of relay HM to (−). Relay HM closes a locking circuit for itself, extending from (+) on conductor MG, make contact of relay XD, make contact and winding of relay HM to (−). As previously mentioned, it will now be explained how relays HM and LM are locked until the end of the second cycle. They are locked over the previously described circuit including a make contact of relay XD until this relay releases, also including a make contact of relay STP (operated before relay XD releases) and also a make contact of relay RG which is the last relay to release at the end of the second cycle. When relay RG is released at the end of the second cycle, relays LM and HM are released because there is no circuit from conductor MG to the windings of these relays. When relay DG is operated at the end of the second cycle (minor switch in position 8) the above described locking circuit to relay STP is opened and this relay is released.

It will thus be seen that, in this example, relays LM and HM are both operated at the time relay STP is operated at the start of the second cycle of the minor switch. Consequently, a circuit is closed for operating relay SIG which may be traced from (+), break contact of relay H, make contact of relay STP, make contact of relay MR, make contacts in series of relays LM and HM and winding of relay SIG to (−). Relay SIG closes a locking circuit for itself extending from (+), break contact of relay H, make contact and winding of relay SIG to (−). The minor switch now advances through to its eighth position for operating relay DG and for clearing out the circuit as previously described. When relay STP is released, a circuit is closed for lighting lamp ANS extending from (+), break contact of relay H, conductor 58, break contact of relay STP, conductor 59, make contact of relay SIG, conductor 60 and lamp ANS to (−). This signals the operator and the circuits are now set up so that a further operation of the dial under this condition will be ineffective to change the circuit conditions. This is because relay SIG, in its operated position, disconnects conductor MG from the contact of relay CA which starts the cycle by the operation of relay SS. Since the circuit to the break contact of relay CB is open at contacts of the HS and LS relays, any further operation of the dial is ineffective to energize coil OPR of the "sensitrol" relay. Since there is no (+) potential on the contact of relay CA, relay XD and magnet MX will not be operated if the dial is turned at this time.

In response to this test, the dial tone is not transmitted back to the calling station, thus indicating to the trouble man that the pulse ratio is not within proper limits and that the operator is being signaled. Since the dial tone pulses to the calling line extend through make contacts of relay RG, by way of a break contact of relay SIG, during the second cycle of the minor switch and since relay SIG is operated, (+) is substituted for the dial tone conductor DT, thus keeping the dial tone off the calling line.

*Pulse length too short*

The circuits operate through the cycles in the previously described manner and, since the pulses are too short while wiper MW is in positions 1–4, the "sensitrol" relay contact does not close and relay LM is not operated. Of course, the "sensitrol" relay contact will not operate when wiper MW is in positions 7–10 if the pulses are short because it takes a longer pulse to operate the "sensitrol" relay in these latter positions than in positions 1–4. Consequently, the circuits will run through their tests with relays LM and HM released, thus completing the circuit through break contacts of these relays to the winding of relay SIG. This means that the operation will be in the previously described manner for signaling the operator and for keeping dial tone off the calling line.

When the operator answers by actuating the pulse check key, relay H is operated over a circuit extending from (+), make contact of this key, conductor 61 and winding of relay H to (−). Relay H disconnects (+) from the locking circuit of relay SIG for effecting the release of this relay, which in turn opens up and extinguishes lamp ANS. Relay H also disconnects (+) from master ground conductor MG, thus restoring the test circuit to normal and providing a holding and make busy circuit for the preceding switches and circuits at the lower inner make contact of relay H until the operator releases. The operator talks to the calling party by way of a test position circuit (not shown), conductors PT and PR, make contacts of the pulse check key and condensers C1 and C2 to the calling line. In the event that the operator desires to connect the calling line directly through conductor PT and PR to a test circuit at the operator's position for further check, a circuit at the position (not shown) may connect (+) to conductor PS for operating relay GS.

*Miscellaneous calibration and test circuits*

Means have been provided for calibrating relay PS. In order to check the operation of relay PS, the speed calibration key is actuated. This makes the test circuit busy by applying (+) through the right hand make contact of the key to the sleeve conductor S. The left hand make contact of this key applies (+) to conductor 11, it being recalled that (+) on conductor 11 causes the pulse generating relays and the stepping relays to run through their cycles of operation. This means that the stepping relays will go through two cycles of operations per second, with relays SJ and SK being operated twice during the one-second interval that the twenty pulses are transmitted to the stepping relays by relay PM. Since relay SJ operates and relay SK then operates just before relay SJ releases, a circuit is closed for energizing the speed calibration lamp extending from (+), break contact of relay H, conductor 21, break contact of relay RD, conductor 62 and make contact of either relay SJ or SK to the lamp. Consequently, this lamp will flash at a rate of two flashes per second if the speed of relay PS is proper. By adjusting rheostat RH1, the proper pulsing speed of relay PS may be obtained.

With the speed calibration key operated and the pulsing and stepping operations being effected as above, the busy and pulse key may be operated for checking the per cent make of relay PM. This latter key connects the break contact of relay PM to the upper sleeve of the monitor and test jack. Consequently, a monitor and test plug (not shown) connected to this jack may extend the circuit, to which the pulses from relay PM are applied, to a measuring device at the test position for measuring the operation of relay PM. Minor variations in the per cent make at the contact of relay PM may be obtained by adjusting rheostat RH2.

With the busy and pulse key normal and a plug in the monitor and test jack, the calling party may dial into the test circuit and the pulses at the break contact of relay CB may be checked in this test circuit over a circuit including the upper tip of the jack and plug. Furthermore, the pulses at the make contact of relay CA may be checked in the test circuit over a circuit including the upper sleeve of the test jack during the dialing by the calling party.

The ten lamps shown in Fig. 4 are for the purpose of giving the test clerk a check of the operation of the minor switch from the calling dial. For example, the calling party may ask the test clerk to check the number of steps the minor switch takes when a particular digit is dialed. Relay H is operated, when the operator answers, and connects the winding of relay XD by way of a make contact of relay RD to the break contact of relay CB. Consequently, the pulses from the break contact of relay CB are applied to relay XD and magnet MX so that the minor switch steps in response to the dialed pulses. With relays XD and H operated, (+) is extended by way of wiper LW to the lamps, thus these lamps are flashed as the minor switch steps. When the dial stops, relay XH remains operated for a short interval, then when it releases it opens up the circuit to wiper LW, consequently the lamp corresponding to the position at which the minor switch stops will remain lighted for a short interval (longer than at each preceding step) as a visual indication of the position at which the minor switch actually stops in response to the dialed digit. During this dialing operation, relay G is operated over a circuit including make contacts of relays XD and H. At the termination of the impulses, relay XD releases and shortly thereafter relay RG releases. During the interval between the release of relay XD and the release of relay RG, a circuit is closed for releasing the minor switch, thus placing it in condition for repeating this operation. This circuit may be traced from (+), break contact of relay XD, make contact of relay H, make contact of relay RG, conductor 41, off normal contact 2MON and winding of magnet MZ to (−).

It should be understood that numerous modifications in the details of the circuit arrangements may be effected without departing from the scope of the invention as defined in the appended claims.

What I claim is:

1. In a telephone system, an operator's position, a subscriber's substation including a transmitter operative to transmit impulses, testing apparatus operative to test the impulse ratio of said transmitter, means controlled by an initial operation of said transmitter for operatively associating said transmitter with said testing apparatus, means in said testing apparatus controlled by further operation of said transmitter for operating said testing apparatus, and means controlled by said operation of said testing apparatus for selectively signaling said operator's position or said substation in accordance with the tested impulse ratio of said transmitter.

2. In a telephone system, an operator's position, a signal at said operator's position, a subscriber's substation including a transmitter operative to transmit impulses, testing apparatus operative to test the impulse ratio of said transmitter, means controlled by an initial operation of said transmitter for operatively associating said transmitter with said testing apparatus, means in said testing apparatus controlled by further operation of said transmitter for operating said testing apparatus, means controlled by said operation of said testing apparatus by said further operation of said transmitter for transmitting a signal to said substation indicating that the impulse ratio of said transmitter is within predetermined limits, and means controlled by the operation of said testing apparatus by said further operation of said transmitter for transmitting a signal to said operator's position indicating that the impulse ratio of said transmitter is outside said predetermined limits.

3. In a telephone system, an operator's position, a visual signal at said operator's position, a subscriber's substation including a transmitter operative to transmit impulses, testing apparatus operative to test the impulse ratio of said transmitter, means controlled by an initial operation of said transmitter for operatively associating said transmitter with said testing apparatus, means in said testing apparatus controlled by further operation of said transmitter for operating said testing apparatus, means controlled by said operation of said testing apparatus by said further operation of said transmitter for transmitting a signal to said substation indicating that the impulse ratio of said transmitter is within predetermined limits, and means controlled by the operation of said testing apparatus by said further operation of said transmitter for operating said visual signal indicating that the impulse ratio of said transmitter is outside said predetermined limits.

4. In a telephone system, a subscriber's substation including a transmitter operative to transmit impulses, testing apparatus operative to test both the impulse ratio and the impulse speed of said transmitter, means controlled by an initial operation of said transmitter for operatively associating said transmitter with said testing apparatus, means in said testing apparatus controlled by further operation of said transmitter for operating said testing apparatus, means controlled by said operation of said testing apparatus for transmitting a signal to said substation indicative of the speed of said transmitter, means controlled by said operation of said testing apparatus for testing the impulse ratio of said transmitter, and means including said last named means for preventing the transmission of said signal to said substation when said impulse ratio is outside predetermined limits.

5. In a telephone system, an operator's position, a signal at said operator's position, a subscriber's substation including a transmitter operative to transmit impulses, testing apparatus operative to test both the impulse ratio and the impulse speed of said transmitter, means controlled by an initial operation of said transmitter for operatively associating said transmitter with said testing apparatus, means in said testing apparatus controlled by further operation of said transmitter for operating said testing apparatus, means controlled by said operation of said testing apparatus for transmitting a signal to said substation indicative of the speed of said transmitter, means controlled by said operation of said testing apparatus for testing the impulse ratio of said transmitter, and means including said last named means for preventing the transmission of said signal to said substation and for operating said signal at said operator's position when said impulse ratio is outside predetermined limits.

6. In a telephone system, a subscriber's substation including a transmitter operative to transmit impulses, testing apparatus operative to test the impulse ratio of said transmitter, means controlled by an initial operation of said transmitter for connecting said transmitter with said testing apparatus, means responsive to the connection of said transmitter with said testing apparatus for transmitting a signal to said substation, means in said testing apparatus controlled by further operation of said transmitter for operating said testing apparatus, means controlled by said operation of said testing apparatus for testing the impulse ratio of said transmitter, and means for continuing or discontinuing the transmission of said signal to said substation in accordance with whether the tested impulse ratio of said transmitter is within or without predetermined limits respectively.

7. In a telephone system, an operator's position, a signal at said operator's position, a subscriber's substation including a transmitter operative to transmit impulses, testing apparatus operative to test the impulse ratio of said transmitter, means controlled by an initial operation of said transmitter for connecting said transmitter with said testing apparatus, means responsive to the connection of said transmitter with said testing apparatus for transmitting a signal to said substation, means in said testing apparatus controlled by further operation of said transmitter for operating said testing apparatus, means controlled by said operation of said testing apparatus for testing the impulse ratio of said transmitter, means for continuing or discontinuing the transmission of said signal to said substation in accordance with whether the tested impulse ratio of said transmitter is within or without said predetermined limits respectively, and means responsive to said testing apparatus testing the impulse ratio of a transmitter outside predetermined limits for operating the signal at said operator's position.

8. In an automatic telephone system, a central office, a subscriber's substation having an impulse transmitter, a plurality of testing means in said central office each having a set of limits individual thereto, means controlled by an initial operation of said impulse transmitter for selecting said plurality of testing means, means responsive to further operation of said impulse transmitter for causing said plurality of testing means to determine whether the impulse speed and the impulse length of the impulses transmitted by said impulse transmitter are within said set of limits of said plurality of testing means, and means controlled by said plurality of testing means only when the impulse speed and the impulse length of the impulses transmitted by said impulse transmitter are within said set of limits for transmitting an audible signal to said substation.

9. In an automatic telephone system; a central office; a subscriber's substation having an impulse transmitter; a testing unit in said central office comprising a first means for testing the speed of said transmitter and a second means for testing the ratio of the make to break portions of impulses produced by said transmitter, each having a predetermined set of limits; means controlled by an initial operation of said impulse transmitter for selecting said testing unit; means responsive to further operation of said impulse transmitter for transmitting a plurality of impulses to said first and said second testing means; means responsive to the speed of said plurality of impulses being within the predetermined limits of said first testing means for transmitting a signal to said substation indicative of the speed of said impulse transmitter; and means responsive to the ratio of said plurality of impulses being without the predetermined limits of said second testing means for preventing the transmission of said signal to said substation.

10. In an automatic telephone system; a central office; a subscriber's substation having an impulse transmitter; a testing unit in said central office comprising a first and a second testing means, each having a predetermined set of limits; means controlled by an initial operation of said impulse transmitter for operatively associating said impulse transmitter with said testing unit; means responsive to further operation of said impulse transmitter for transmitting a plurality of impulses to said first and said second testing means; means in said second testing means for testing the ratio of said impulses transmitted by said further operation, means in said first testing means for testing the speed of said impulses transmitted by said further operation, means for selectively transmitting coded signals in accordance with said speed test, and means for disabling said last named means when said second testing means indicates an unstandard ratio.

11. In an automatic telephone system; a central office; a subscriber's substation having an impulse transmitter; a testing unit in said central office comprising a first means for testing the speed of said transmitter and a second means for testing the ratio of the make to break portions of impulses produced by said transmitter, each having a predetermined set of limits; means controlled by an initial operation of said impulse transmitter for operatively associating said impulse transmitter with said testing unit; means responsive to further operation of said impulse transmitter for transmitting a plurality of impulses to said first and said second testing means; means responsive to the speed of said plurality of impulses for transmitting a first coded signal to said substation if the speed of said impulses lies within the predetermined limits of said first testing means, a second coded signal to said substation if the speed of said impulses lies on one side of said predetermined limits and a third coded signal to said substation if the speed of said impulses lies on the other side of said predetermined limits, and means for disabling said last named means if the ratio of said impulses lies without the limit of said second testing means.

12. In a telephone system, a transmitter operative to transmit impulses, an impulse contact means for repeating said impulses, and means for measuring the percentage of make and break periods of said impulse contact comprising a test relay having an operating winding, a self-locking contact and a restoring winding; means for applying impulses corresponding to the make periods of said impulse contact to the operating winding of said test relay, means whereby said self-locking contact is operated to its self-locking position in response to a predetermined length of the make period of said impulse contact; and means automatically controlled by a predetermined number of closures of said impulse contact for energizing said restoring winding, whereby said self-locking contact is restored from its locked position.

13. In a telephone system, a transmitter operative to transmit impulses, means including an impulse relay for repeating said impulses, and means for measuring the percentage of released and operated periods of said impulse relay comprising a test relay having an operating winding, a self-locking contact and a restoring winding; means for applying impulses corresponding to the released periods of said impulse relay to the operating winding of said test relay, means whereby said self-locking contact is operated to its self-locking position in response to a predetermined length of the released period of said impulse relay; means automatically controlled by a predetermined number of operations of said impulse relay for energizing said restoring winding, whereby said self-locking contact is released from its locked position; a signal; and means for operating said signal in response to said impulses being substantially different from said predetermined length.

14. In a telephone system, a transmitter operative to transmit impulses, means including an impulse relay for repeating said impulses, and means for measuring the speed and the percentage of released and operated periods of said impulse relay comprising a test relay having an operating winding, a self-locking contact and a restoring winding; means for applying impulses corresponding to the released periods of said impulse relay to the operating winding of said test relay, means whereby said self-locking contact is operated to its self-locking position in response to a predetermined length of the released period of said impulse relay; means automatically controlled by a predetermined number of operations of said impulse relay for energizing said restoring winding, whereby said self-locking contact is released from its locked position; a signal; means for operating said signal in response to said impulses being substantially different from said predetermined length; and additional signaling means selectively operated in accordance with the speed of said impulse relay.

References Cited in the file of this patent

UNITED STATES PATENTS

| Number | Name | Date |
|---|---|---|
| 1,677,157 | Weaver | July 17, 1928 |
| 2,244,338 | Krebs | June 3, 1941 |
| 2,360,989 | Van Damme | Oct. 24, 1944 |
| 2,369,619 | Stibitz | Feb. 13, 1945 |
| 2,486,172 | Kessler | Oct. 25, 1949 |
| 2,489,282 | From | Nov. 29, 1949 |
| 2,400,287 | Kent | Mar. 14, 1950 |